(12) United States Patent
Bertness et al.

(10) Patent No.: US 6,788,025 B2
(45) Date of Patent: Sep. 7, 2004

(54) BATTERY CHARGER WITH BOOSTER PACK

(75) Inventors: Kevin I. Bertness, Batavia, IL (US); J. David Vonderhaar, Bolingbrook, IL (US)

(73) Assignee: Midtronics, Inc., Willowbrook, IL (US)

(*) Notice: Subject to any disclaimer, the term of this patent is extended or adjusted under 35 U.S.C. 154(b) by 0 days.

(21) Appl. No.: 10/177,635

(22) Filed: Jun. 21, 2002

(65) Prior Publication Data

US 2003/0011344 A1 Jan. 16, 2003

Related U.S. Application Data

(60) Provisional application No. 60/300,386, filed on Jun. 22, 2001.

(51) Int. Cl.[7] ................................................. H02J 7/00
(52) U.S. Cl. ..................................... 320/104; 320/105
(58) Field of Search ................................. 320/103, 104, 320/105, 107, 111, 112, 134, 139; 307/66; 324/110, 109, 156

(56) References Cited

U.S. PATENT DOCUMENTS

| | | |
|---|---|---|
| 2,514,745 A | 7/1950 | Dalzell .......................... 171/95 |
| 3,356,936 A | 12/1967 | Smith ......................... 324/29.5 |
| 3,562,634 A | 2/1971 | Latner .............................. 31/4 |
| 3,593,099 A | 7/1971 | Scholl ........................... 320/13 |
| 3,607,673 A | 9/1971 | Seyl .............................. 204/1 |
| 3,676,770 A | 7/1972 | Sharaf et al. .............. 324/29.5 |
| 3,729,989 A | 5/1973 | Little ........................... 73/133 |
| 3,753,094 A | 8/1973 | Furuishi et al. ............ 324/29.5 |
| 3,808,522 A | 4/1974 | Sharaf ....................... 324/29.5 |
| 3,811,089 A | 5/1974 | Strezelewicz ............... 324/170 |
| 3,873,911 A | 3/1975 | Champlin .................. 324/29.5 |
| 3,876,931 A | 4/1975 | Godshalk ................... 324/29.5 |
| 3,886,443 A | 5/1975 | Miyakawa et al. ........ 324/29.5 |
| 3,889,248 A | 6/1975 | Ritter .......................... 340/249 |
| 3,906,329 A | 9/1975 | Bader ........................... 320/44 |
| 3,909,708 A | 9/1975 | Champlin .................. 324/29.5 |
| 3,936,744 A | 2/1976 | Perlmutter .................. 324/158 |
| 3,946,299 A | 3/1976 | Christianson et al. ......... 320/43 |
| 3,947,757 A | 3/1976 | Grube et al. .................. 324/28 |
| 3,969,667 A | 7/1976 | McWilliams ............... 324/29.5 |
| 3,979,664 A | 9/1976 | Harris .......................... 324/17 |
| 3,984,762 A | 10/1976 | Dowgiallo, Jr. ............ 324/29.5 |
| 3,989,544 A | 11/1976 | Santo ........................... 429/65 |
| 4,008,619 A | 2/1977 | Alcaide et al. ............... 73/398 |
| 4,024,953 A | 5/1977 | Nailor, III .................. 206/344 |
| 4,047,091 A | 9/1977 | Hutchines et al. ........... 363/59 |

(List continued on next page.)

FOREIGN PATENT DOCUMENTS

| | | |
|---|---|---|
| DE | 29 26 716 B1 | 1/1981 |
| EP | 0 022 450 A1 | 1/1981 |
| EP | 0 637 754 A1 | 2/1995 |

(List continued on next page.)

OTHER PUBLICATIONS

"Electrochemical Impedance Spectroscopy in Battery Development and Testing" *Batteries International*, Apr. 1997, pp. 59 and 62–63.

(List continued on next page.)

Primary Examiner—Rajnikant B Patel
(74) Attorney, Agent, or Firm—Westman, Champlin & Kelly

(57) ABSTRACT

An apparatus and method for supplying energy to a vehicle battery is provided. The apparatus includes a positive connector that couples to a positive terminal of the vehicle battery and a negative connector that couples to a negative terminal of the vehicle battery. A battery charger applies a charge signal to the vehicle battery through the positive and negative connectors to thereby charge the vehicle battery. A jump-start booster pack, coupled to the battery charger, can optionally provide starting energy to the vehicle battery through the positive and negative connectors. The booster pack can be charged by the charge signal.

22 Claims, 4 Drawing Sheets

U.S. PATENT DOCUMENTS

| | | | |
|---|---|---|---|
| 4,053,824 A | 10/1977 | Dupuis et al. | 324/29.5 |
| 4,070,624 A | 1/1978 | Taylor | 327/158 |
| 4,086,531 A | 4/1978 | Bernier | 324/158 |
| 4,112,351 A | 9/1978 | Back et al. | 324/16 |
| 4,114,083 A | 9/1978 | Benham et al. | 320/39 |
| 4,126,874 A | 11/1978 | Suzuki et al. | 354/60 |
| 4,178,546 A | 12/1979 | Hulls et al. | 324/158 |
| 4,193,025 A | 3/1980 | Frailing et al. | 324/427 |
| 4,207,611 A | 6/1980 | Gordon | 364/580 |
| 4,217,645 A | 8/1980 | Barry et al. | 364/483 |
| 4,297,639 A | 10/1981 | Branham | 324/429 |
| 4,315,204 A | 2/1982 | Sievers et al. | 322/28 |
| 4,316,185 A | 2/1982 | Watrous et al. | 340/636 |
| 4,322,685 A | 3/1982 | Frailing et al. | 324/429 |
| 4,351,405 A | 9/1982 | Fields et al. | 180/65 |
| 4,361,809 A | 11/1982 | Bil et al. | 324/426 |
| 4,363,407 A | 12/1982 | Backler et al. | 209/3.3 |
| 4,369,407 A | 1/1983 | Korbell | 324/416 |
| 4,379,989 A | 4/1983 | Kurz et al. | 320/26 |
| 4,379,990 A | 4/1983 | Sievers et al. | 322/99 |
| 4,390,828 A | 6/1983 | Converse et al. | 320/32 |
| 4,392,101 A | 7/1983 | Saar et al. | 320/20 |
| 4,396,880 A | 8/1983 | Windebank | 320/21 |
| 4,408,157 A | 10/1983 | Beaubien | 324/62 |
| 4,412,169 A | 10/1983 | Dell 'Orto | 320/64 |
| 4,423,378 A | 12/1983 | Marino et al. | 324/427 |
| 4,423,379 A | 12/1983 | Jacobs et al. | 324/429 |
| 4,424,491 A | 1/1984 | Bobbett et al. | 324/433 |
| 4,459,548 A | 7/1984 | Lentz et al. | 324/429 |
| 4,514,694 A | 4/1985 | Finger | 324/429 |
| 4,520,353 A | 5/1985 | McAuliffe | 340/636 |
| 4,633,418 A | 12/1986 | Bishop | 364/554 |
| 4,659,977 A | 4/1987 | Kissel et al. | 320/64 |
| 4,663,580 A | 5/1987 | Wortman | 320/35 |
| 4,665,370 A | 5/1987 | Holland | 324/429 |
| 4,667,143 A | 5/1987 | Cooper et al. | 320/22 |
| 4,667,279 A | 5/1987 | Maier | 363/46 |
| 4,678,998 A | 7/1987 | Muramatsu | 324/427 |
| 4,679,000 A | 7/1987 | Clark | 324/428 |
| 4,680,528 A | 7/1987 | Mikami et al. | 320/32 |
| 4,697,134 A | 9/1987 | Burkum et al. | 320/48 |
| 4,707,795 A | 11/1987 | Alber et al. | 364/550 |
| 4,709,202 A | 11/1987 | Koenck et al. | 320/43 |
| 4,710,861 A | 12/1987 | Kanner | 363/46 |
| 4,719,428 A | 1/1988 | Liebermann | 324/436 |
| 4,743,855 A | 5/1988 | Randin et al. | 324/430 |
| 4,745,349 A | 5/1988 | Palanisamy et al. | 320/22 |
| 4,816,768 A | 3/1989 | Champlin | 324/428 |
| 4,820,966 A | 4/1989 | Fridman | 320/32 |
| 4,825,170 A | 4/1989 | Champlin | 324/436 |
| 4,847,547 A | 7/1989 | Eng, Jr. | 320/35 |
| 4,849,700 A | 7/1989 | Morioka et al. | 324/427 |
| 4,876,495 A | 10/1989 | Palanisamy et al. | 320/18 |
| 4,881,038 A | 11/1989 | Champlin | 324/426 |
| 4,901,007 A * | 2/1990 | Sworm | 324/110 |
| 4,912,416 A | 3/1990 | Champlin | 324/430 |
| 4,913,116 A | 4/1990 | Katogi et al. | 123/425 |
| 4,929,931 A | 5/1990 | McCuen | 340/636 |
| 4,931,738 A | 6/1990 | MacIntyre et al. | 324/435 |
| 4,937,528 A | 6/1990 | Palanisamy | 324/430 |
| 4,947,124 A | 8/1990 | Hauser | 324/430 |
| 4,956,597 A | 9/1990 | Heavey et al. | 320/14 |
| 4,968,941 A | 11/1990 | Rogers | 324/428 |
| 4,968,942 A | 11/1990 | Palanisamy | 324/426 |
| 5,004,979 A | 4/1991 | Marino et al. | 324/160 |
| 5,032,825 A | 7/1991 | Kuznicki | 340/636 |
| 5,037,778 A | 8/1991 | Stark et al. | 437/216 |
| 5,047,722 A | 9/1991 | Wurst et al. | 324/430 |
| 5,087,881 A | 2/1992 | Peacock | 324/378 |
| 5,095,223 A | 3/1992 | Thomas | 307/110 |
| 5,126,675 A | 6/1992 | Yang | 324/435 |
| 5,140,269 A | 8/1992 | Champlin | 324/433 |
| 5,144,218 A | 9/1992 | Bosscha | 320/44 |
| 5,144,248 A | 9/1992 | Alexandres et al. | 324/428 |
| 5,160,881 A | 11/1992 | Schramm et al. | 322/7 |
| 5,170,124 A | 12/1992 | Blair et al. | 324/434 |
| 5,179,335 A | 1/1993 | Nor | 320/21 |
| 5,194,799 A * | 3/1993 | Tomantschger | 320/103 |
| 5,204,611 A | 4/1993 | Nor et al. | 320/21 |
| 5,214,370 A | 5/1993 | Harm et al. | 320/35 |
| 5,214,385 A | 5/1993 | Gabriel et al. | 324/434 |
| 5,241,275 A | 8/1993 | Fang | 324/430 |
| 5,254,952 A | 10/1993 | Salley et al. | 324/429 |
| 5,266,880 A | 11/1993 | Newland | 320/14 |
| 5,281,919 A | 1/1994 | Palanisamy | 324/427 |
| 5,295,078 A | 3/1994 | Stich et al. | 364/483 |
| 5,298,797 A | 3/1994 | Redl | 307/246 |
| 5,300,874 A | 4/1994 | Shimamoto et al. | 320/15 |
| 5,302,902 A | 4/1994 | Groehl | 324/434 |
| 5,315,287 A | 5/1994 | Sol | 340/455 |
| 5,321,626 A | 6/1994 | Palladino | 364/483 |
| 5,331,268 A | 7/1994 | Patino et al. | 320/20 |
| 5,336,993 A | 8/1994 | Thomas et al. | 324/158.1 |
| 5,338,515 A | 8/1994 | Dalla Betta et al. | 422/95 |
| 5,339,018 A | 8/1994 | Brokaw | 320/35 |
| 5,343,380 A | 8/1994 | Champlin | 363/46 |
| 5,412,323 A | 8/1994 | Brokaw | 320/35 |
| 5,347,163 A | 9/1994 | Yoshimura | 307/66 |
| 5,352,968 A | 10/1994 | Reni et al. | 320/35 |
| 5,365,160 A | 11/1994 | Leppo et al. | 320/22 |
| 5,365,453 A | 11/1994 | Startup et al. | |
| 5,381,096 A | 1/1995 | Hirzel | 324/427 |
| 5,426,371 A | 6/1995 | Salley et al. | 324/429 |
| 5,426,416 A | 6/1995 | Jefferies et al. | 340/664 |
| 5,432,426 A | 7/1995 | Yoshida | 320/20 |
| 5,434,495 A | 7/1995 | Toko | 320/44 |
| 5,435,185 A | 7/1995 | Eagan | 73/587 |
| 5,442,274 A | 8/1995 | Tamai | 320/23 |
| 5,445,026 A | 8/1995 | Eagan | 73/591 |
| 5,449,996 A | 9/1995 | Matsumoto et al. | 320/20 |
| 5,449,997 A | 9/1995 | Gilmore et al. | 320/39 |
| 5,451,881 A | 9/1995 | Finger | 324/433 |
| 5,457,377 A | 10/1995 | Jonsson | 320/5 |
| 5,469,043 A | 11/1995 | Cherng et al. | 320/31 |
| 5,485,090 A | 1/1996 | Stephens | 324/433 |
| 5,488,300 A | 1/1996 | Jamieson | 324/432 |
| 5,519,383 A | 5/1996 | De La Rosa | 340/636 |
| 5,528,148 A | 6/1996 | Rogers | 324/426 |
| 5,537,967 A | 7/1996 | Tashiro et al. | 123/792.1 |
| 5,546,317 A | 8/1996 | Andrieu | 364/481 |
| 5,548,273 A | 8/1996 | Nicol et al. | 340/439 |
| 5,550,485 A | 8/1996 | Falk | 324/772 |
| 5,561,380 A | 10/1996 | Sway-Tin et al. | 324/509 |
| 5,562,501 A | 10/1996 | Kinoshita et al. | 439/852 |
| 5,572,136 A | 11/1996 | Champlin | 324/426 |
| 5,574,355 A | 11/1996 | McShane et al. | 320/39 |
| 5,583,416 A | 12/1996 | Klang | 320/22 |
| 5,585,728 A | 12/1996 | Champlin | 324/427 |
| 5,589,757 A | 12/1996 | Klang | 320/22 |
| 5,592,093 A | 1/1997 | Klingbiel | 324/426 |
| 5,596,260 A | 1/1997 | Moravec et al. | 320/30 |
| 5,598,098 A | 1/1997 | Champlin | 324/430 |
| 5,602,462 A | 2/1997 | Stich et al. | 323/258 |
| 5,606,242 A | 2/1997 | Hull et al. | 320/48 |
| 5,621,298 A | 4/1997 | Harvey | 320/5 |
| 5,633,985 A | 5/1997 | Severson et al. | 395/2.76 |
| 5,637,978 A | 6/1997 | Kellett et al. | 320/2 |
| 5,642,031 A | 6/1997 | Brotto | 320/21 |
| 5,650,937 A | 7/1997 | Bounaga | 364/483 |
| 5,652,501 A | 7/1997 | McClure et al. | 320/17 |
| 5,653,659 A | 8/1997 | Kunibe et al. | 477/111 |

| | | | | | | |
|---|---|---|---|---|---|---|
| 5,656,920 A | 8/1997 | Cherng et al. .............. 320/31 | | 6,307,349 B1 | 10/2001 | Koenck et al. ........... 320/112 |
| 5,675,234 A | 10/1997 | Greene ....................... 320/15 | | 6,310,481 B2 | 10/2001 | Bertness ................... 324/430 |
| 5,677,077 A | 10/1997 | Faulk ........................ 429/90 | | 6,313,607 B1 | 11/2001 | Champlin .................. 320/132 |
| 5,699,050 A | 12/1997 | Kanazawa ................. 340/636 | | 6,316,914 B1 | 11/2001 | Bertness ................... 320/134 |
| 5,701,089 A | 12/1997 | Perkins ...................... 327/772 | | 6,323,650 B1 | 11/2001 | Bertness et al. ........... 324/426 |
| 5,705,929 A | 1/1998 | Caravello et al. ........... 324/430 | | 6,329,793 B1 | 12/2001 | Bertness et al. ........... 320/132 |
| 5,710,503 A | 1/1998 | Sideris et al. ................. 320/6 | | 6,331,762 B1 | 12/2001 | Bertness ................... 320/132 |
| 5,711,648 A | 1/1998 | Hammerslag ............... 414/809 | | 6,332,113 B1 | 12/2001 | Bertness ..................... 702/63 |
| 5,717,336 A | 2/1998 | Basell et al. ................ 324/430 | | 6,346,795 B2 | 2/2002 | Haraguchi et al. .......... 320/136 |
| 5,717,937 A | 2/1998 | Fritz ..................... 395/750.01 | | 6,347,958 B1 | 2/2002 | Tsai .......................... 439/488 |
| 5,739,667 A | 4/1998 | Matsuda et al. ............... 320/5 | | 6,351,102 B1 | 2/2002 | Troy ......................... 320/139 |
| 5,747,909 A | 5/1998 | Syverson et al. ........... 310/156 | | 6,359,441 B1 | 3/2002 | Bertness ................... 324/426 |
| 5,754,417 A | 5/1998 | Nicollini .................... 363/60 | | 6,363,303 B1 | 3/2002 | Bertness |
| 5,757,192 A | 5/1998 | McShane et al. ........... 324/427 | | 6,377,029 B1 | 4/2002 | Krieger et al. ............. 320/139 |
| 5,760,587 A | 6/1998 | Harvey ...................... 324/434 | | 6,384,608 B1 | 5/2002 | Namaky .................... 324/425 |
| 5,773,978 A | 6/1998 | Becker ...................... 324/430 | | 6,388,448 B1 | 5/2002 | Cervas ..................... 324/426 |
| 5,789,899 A | 8/1998 | van Phuoc et al. ........... 320/30 | | 6,392,414 B2 | 5/2002 | Bertness ................... 324/429 |
| 5,793,359 A | 8/1998 | Ushikubo .................. 345/169 | | 6,411,098 B1 | 6/2002 | Laletin ...................... 324/436 |
| 5,808,469 A | 9/1998 | Kopera ..................... 324/43.4 | | 6,417,669 B1 | 7/2002 | Champlin .................. 324/426 |
| 5,818,234 A | 10/1998 | McKinnon ................. 324/433 | | 6,424,158 B2 | 7/2002 | Klang ....................... 324/433 |
| 5,821,756 A | 10/1998 | McShane et al. ........... 324/430 | | 6,441,585 B1 | 8/2002 | Bertness ................... 320/132 |
| 5,825,174 A | 10/1998 | Parker ....................... 324/106 | | 6,445,158 B1 | 9/2002 | Bertness et al. ............ 320/104 |
| 5,831,435 A | 11/1998 | Troy ......................... 324/426 | | | | |
| 5,862,515 A | 1/1999 | Kobayashi et al. ........... 702/63 | | FOREIGN PATENT DOCUMENTS | | |
| 5,872,443 A | 2/1999 | Williamson .................. 320/21 | | EP | 0 772 056 A1 | 5/1997 |
| 5,895,440 A | 4/1999 | Proctor et al. ............... 702/63 | | FR | 2 749 397 | 12/1997 |
| 5,914,605 A | 6/1999 | Bertness .................... 324/430 | | GB | 2 088 159 A | 6/1982 |
| 5,927,938 A | 7/1999 | Hammerslag ............... 414/809 | | JP | 59-17892 | 1/1984 |
| 5,929,609 A | 7/1999 | Joy et al. ..................... 322/25 | | JP | 59-17893 | 1/1984 |
| 5,939,855 A | 8/1999 | Proctor et al. .............. 320/104 | | JP | 59-17894 | 1/1984 |
| 5,939,861 A | 8/1999 | Joko et al. | | JP | 59017894 | 1/1984 |
| 5,945,829 A | 8/1999 | Bertness .................... 324/430 | | JP | 59215674 | 12/1984 |
| 5,951,229 A | 9/1999 | Hammerslag | | JP | 60225078 | 11/1985 |
| 5,961,561 A | 10/1999 | Wakefield, II ............... 701/29 | | JP | 62-180284 | 8/1987 |
| 5,961,604 A | 10/1999 | Anderson et al. ........... 709/229 | | JP | 63027776 | 2/1988 |
| 5,969,625 A | 10/1999 | Russo ....................... 340/636 | | JP | 03282276 | 12/1991 |
| 5,982,138 A | 11/1999 | Krieger .................... 320/105 | | JP | 03284479 | 12/1991 |
| 6,002,238 A | 12/1999 | Champlin .................. 320/134 | | JP | 4-8636 | 1/1992 |
| 6,008,652 A | 12/1999 | Theofanopoulos et al. . 324/434 | | JP | 04131779 | 5/1992 |
| 6,009,369 A | 12/1999 | Boisvert et al. .............. 701/99 | | JP | 04372536 | 12/1992 |
| 6,031,354 A | 2/2000 | Wiley et al. ................ 320/116 | | JP | 5216550 | 8/1993 |
| 6,037,751 A | 3/2000 | Klang ....................... 320/160 | | JP | 7-128414 | 5/1995 |
| 6,037,777 A | 3/2000 | Champlin .................. 324/430 | | JP | 09061505 | 3/1997 |
| 6,051,976 A | 4/2000 | Bertness .................... 324/426 | | JP | 10056744 | 2/1998 |
| 6,072,299 A | 6/2000 | Kurle et al. ................ 320/112 | | RU | 2089015 C1 | 8/1997 |
| 6,072,300 A | 6/2000 | Tsuji ........................ 320/116 | | WO | WO 93/22666 | 11/1993 |
| 6,081,098 A | 6/2000 | Bertness et al. ............ 320/134 | | WO | WO 94/05069 | 3/1994 |
| 6,091,245 A | 7/2000 | Bertness .................... 324/426 | | WO | WO 98/58270 | 12/1998 |
| 6,094,033 A | 7/2000 | Ding et al. ................. 320/132 | | WO | WO 99/23738 | 5/1999 |
| 6,104,167 A | 8/2000 | Bertness et al. ............ 320/132 | | | | |
| 6,114,834 A | 9/2000 | Parise ....................... 320/109 | | OTHER PUBLICATIONS | | |
| 6,137,269 A | 10/2000 | Champlin .................. 320/150 | | | | |
| 6,140,797 A | 10/2000 | Dunn ........................ 320/105 | | | | |
| 6,144,185 A | 11/2000 | Dougherty et al. ......... 320/132 | | | | |
| 6,150,793 A | 11/2000 | Lesesky et al. ............. 320/104 | | | | |
| 6,161,640 A | 12/2000 | Yamaguchi ................ 180/65.8 | | | | |
| 6,163,156 A | 12/2000 | Bertness .................... 324/426 | | | | |
| 6,172,483 B1 | 1/2001 | Champlin .................. 320/134 | | | | |
| 6,172,505 B1 | 1/2001 | Bertness .................... 324/430 | | | | |
| 6,181,545 B1 | 1/2001 | Amatucci et al. | | | | |
| 6,222,369 B1 | 4/2001 | Champlin .................. 324/430 | | | | |
| 6,225,808 B1 | 5/2001 | Varghese et al. ............ 324/426 | | | | |
| 6,236,332 B1 | 5/2001 | Conkright et al. ..... 340/825.06 | | | | |
| 6,249,124 B1 | 6/2001 | Bertness .................... 324/426 | | | | |
| 6,250,973 B1 | 6/2001 | Lowery et al. .............. 439/763 | | | | |
| 6,254,438 B1 | 7/2001 | Gaunt ........................ 439/755 | | | | |
| 6,259,254 B1 | 7/2001 | Klang ........................ 324/427 | | | | |
| 6,262,563 B1 | 7/2001 | Champlin .................. 320/134 | | | | |
| 6,294,896 B1 | 9/2001 | Champlin .................. 320/134 | | | | |
| 6,294,897 B1 | 9/2001 | Champlin .................. 320/153 | | | | |
| 6,304,087 B1 | 10/2001 | Bertness .................... 324/426 | | | | |

"Battery Impedance", by E. Willihganz et al., *Electrical Engineering*, Sep. 1959, pp. 922–925.

"Determining The End of Battery Life", by S. DeBardelaben, IEEE, 1986, pp. 365–368 no date.

"A Look at the Impedance of a Cell", by S. Debardelaben, IEEE, 1988, pp. 394–397 no date.

"The Impedance of Electrical Storage Cells", by N.A. Hampson et al., *Journal of Applied Electrochemistry*, 1980, pp. 3–11.

"A Package for Impedance/Admittance Data Analysis", by B. Boukamp, *Solid State Ionics*, 1986, pp. 136–140.no date "Precision of Impedance Spectroscopy Estimates of Bulk, Reaction Rate, and Diffusion Parameters", by J. Macdonald et al., *J. Electroanal, Chem.*, 1991, pp. 1–11 no date.

Internal Resistance: Harbinger orf Capacity Loss in Starved Electrolyte Sealed Lead Acid Batteries, by Vaccaro, F.J. et al., *AT&T Bell Laboratories*, 1987 IEEE, CH 2477, pp. 128,131.

IEEE Recommended Practice For Maintenance,Testings, and Replacement of Large Lead Storage Batteries for Generating Stations and Substations, *The Institute of ELectrical and ELectronics Engineers, Inc., ANSI/IEEE Std.* 450–1987, Mar. 9, 1987, pp. 7–15.

"Field and Laboratory Studies to Asses the State of Health of Valve–Regulated Lead Acid Batteries: Part I Conductance/Capacity Correlation Studies", by D. Feder et al., IEEE, Aug. 1992, pp. 218–233.

"Battery Impedance", by E. Willihnganz et al., *Electrical Engineering*, Sep. 1959, pp. 922–925.

"JIS Japanese Industrial Standard–Lead Acid Batteries for Automobiles", *Japanese Standards Association UDC*, 621.355.2:629.113.006, Nov. 1995.

"Performance of Dry Cells", by C. Hambuechen, Preprint of *Am. Electrochem Soc.*, Apr. 18–20, 1912, paper No. 19, pp. 1–5.

"A Bridge for Measuring Storage Battery Resistance", by E. Willihncanz, *The Electrochemical Society*, preprint 79–20, Apr. 1941, pp. 253–258.

National Semiconductor Corporation, "High Q Notch Filter". Mar. 1969, Linear Brief 5, Mar. 1969.

Burr–Brown Corporation, "Design A 60 HZ Notch Filter with the UAF42", Jan. 1994, AB–071, 1994, No Date.

National Semiconductor Corporation, "LMF90–$4^{th}$–Order Elliotic Nitch Filter", Dec. 1994, RRD–B30M115, Dec. 1994.

"Alligator Clips with Wire Penetrators" J.S. Popper, Inc. product downloaded from http://www.jspopper.com/, undated.

"#: LM78S40 Simple Switcher DC to DC Converter", *ITM e–Catalog*, downloaded from http://www.pcbcafe.cafe.com, undated.

"Simple DC–DC Converts Allows Use of Single Battery", *Electronix Express*, downloaded from http://www.elexp.com/t‾dc–dc.htm, undated.

"DC–DC Converter Basics", *Power Designers*, downloaded from http://www.powederdesigners.com/InforWeb.design_center/articles/DC–DC/converter.shtm, undated.

\* cited by examiner

BATTERY CHARGER WITH BOOSTER PACK

CROSS REFERENCE TO RELATED APPLICATION

This application claims priority of U.S. Provisional Application No. 60/300,386, filed Jun. 22, 2001 and entitled "BATTERY CHARGER WITH BOOSTER PACK".

BACKGROUND OF THE INVENTION

The present invention relates to rechargeable storage batteries. More specifically, the present invention relates to a battery charger/tester with an integrated jump-start booster pack for use with such storage batteries.

Chemical batteries which create electricity from chemical reactions have been known for many years. Such batteries are becoming increasingly important and have found uses throughout industry. These uses include automobiles, UPS systems, etc.

One advantage of chemical batteries, such as lead acid storage batteries, is that they can be charged and the chemical process reversed by forcing electricity through the battery. Charging systems are widely known in the art and are widely available in the consumer market. One of the most common techniques for recharging storage batteries is simply placing a voltage source across the battery having a voltage which is greater than the battery voltage. The voltage difference will cause a charging current to flow through the battery causing a reversal of the chemical reaction. More sophisticated chargers have also been developed in which battery voltage is monitored in an attempt to determine when a battery is fully charged. In addition, techniques have been developed for charging a battery in which the condition of the battery is monitored throughout the charging process.

As mentioned above, rechargeable batteries are employed in automobiles. These rechargeable vehicle batteries provide cranking power to start the vehicle and are also the only source of power to continue to maintain the lights or other devices in operation when the vehicle ignition has been turned off. Circumstances may occur that cause the vehicle battery charge to deplete so that the battery is incapable of starting the vehicle. Such conditions normally arise due to the fact that the operator of the vehicle has inadvertently left the lights, radio, or other energy consuming device or accessory running in the vehicle after the vehicle ignition has been turned off. Such a depleted or "dead" battery is incapable of providing the necessary cranking power to start the vehicle. Frequently, a jump-start booster pack is used to provide cranking energy to start the vehicle under these conditions. A battery charger is another alternative for charging a depleted battery. The disadvantage of a battery charger is that it typically needs to be connected to an alternating current (AC) supply which may not be accessible where the vehicle battery dies. A jump start booster pack typically includes a battery of the same terminal voltage as the vehicle battery but of much smaller capacity. The jump-start booster pack need not be connected to a power supply and is therefore convenient to use wherever the vehicle battery dies. A disadvantage of a jump-start booster battery is that it usually cannot be recharged easily and may be in a depleted condition when it is required to charge a dead battery.

SUMMARY OF THE INVENTION

In accordance with an aspect of the present invention, an apparatus that supplies energy to a vehicle battery is provided. The apparatus includes a positive connector that couples to a positive terminal of the vehicle battery and a negative connector that couples to a negative terminal of the vehicle battery. A battery charger applies a charge signal to the vehicle battery through the positive and negative connectors to thereby charge the vehicle battery. A jump-start booster pack, coupled to the battery charger, can optionally provide starting energy to the vehicle battery through the positive and negative connectors. The booster pack can be charged by the charge signal.

BRIEF DESCRIPTION OF THE DRAWINGS

FIG. 1-2 is an exploded view of a battery charger with an integrated jump-start booster pack in accordance with an embodiment of the present invention.

FIG. 2-1 is a simplified block diagram of a battery charging system incorporating a jump-start booster pack in accordance with an embodiment of the present invention.

FIG. 2-2 illustrates an example of jump-start booster pack circuitry within the combined battery charger and booster pack of the present invention.

DETAILED DESCRIPTION OF THE PREFERRED EMBODIMENTS

Figure 1:
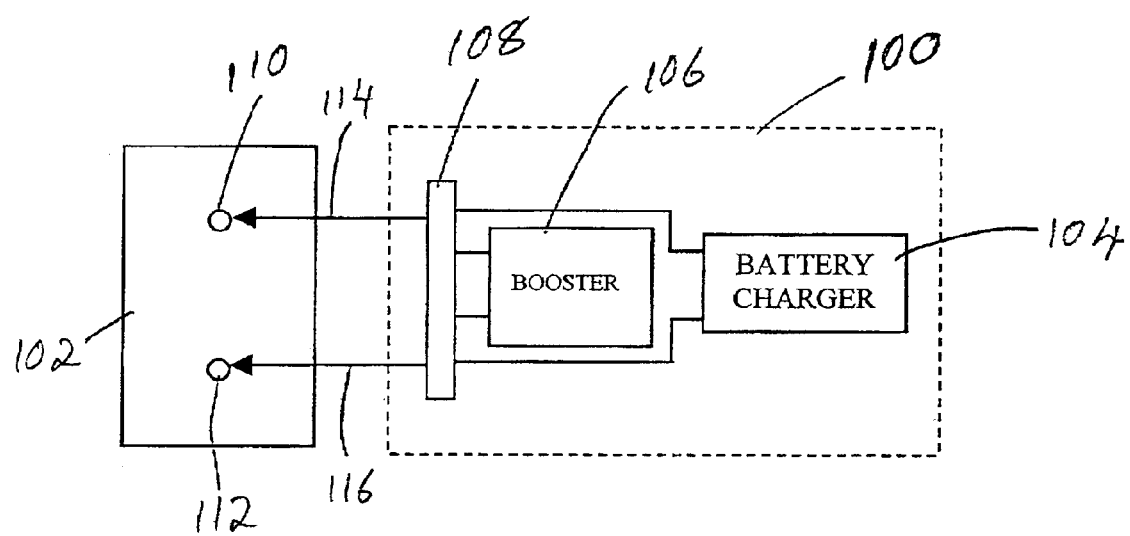
FIG. 1-1 is a simplified block diagram of a battery charger with an integrated jump-start booster pack in accordance with an embodiment of the present invention.

FIG. 1-1 is a simplified block diagram of a battery charger with an integrated jump-start booster pack in accordance with an embodiment of the present invention. The same reference numerals are used in the various figures to represent the same or similar elements. System 100 is shown coupled to a vehicle battery 102. System 100 includes battery charging circuitry 104, jump-start booster pack 106 and mode selection switch 108. System 100 couples to battery contacts 110 and 112 through electrical connections 114 and 116 respectively. Details and components of a battery charging circuit 104 are provided further below in connection with FIG. 2-1. Jump-start booster pack 106, which is described further below in connection with FIG. 2-2, typically includes an internal booster battery of the same terminal voltage as vehicle battery 102 but is of much smaller capacity. Mode selection switch 108 can be set in different positions, with each position corresponding to a different mode in which system 100 operates. For example, system 100 can be set to operate in modes such as "charge vehicle battery", "charge booster battery", "charge vehicle battery and booster battery", "jump-start vehicle battery", "test vehicle battery", "test booster battery", "use booster battery as direct current source", "use booster battery as alternating current source", "combine output of booster battery and charger", etc. System 100 does not have to be connected to a power outlet when operating in "jump-start vehicle battery", "use booster battery as direct current source" or "use booster battery as alternating current source" mode. System 100 is typically connected to a power outlet when operating in other modes.

Thus, by combining battery charger 104 with booster pack 106, system 100 can be used to charge/start vehicle battery 102 when close to an electrical outlet, or in locations where an electrical outlet is not available. As mentioned above, when system 100 is used for charging vehicle battery 102, it can also simultaneously recharge an internal battery of booster pack 106. System 100 can also include a battery test circuit (described further below in connection with FIG. 2-1) that can test both vehicle battery 102 and the internal battery of booster pack 106. System 100 may be transportable on wheels or may also be portable. A portable embodiment of system 100 is described below in connection with FIG. 1-2.

Figures 1, 2:
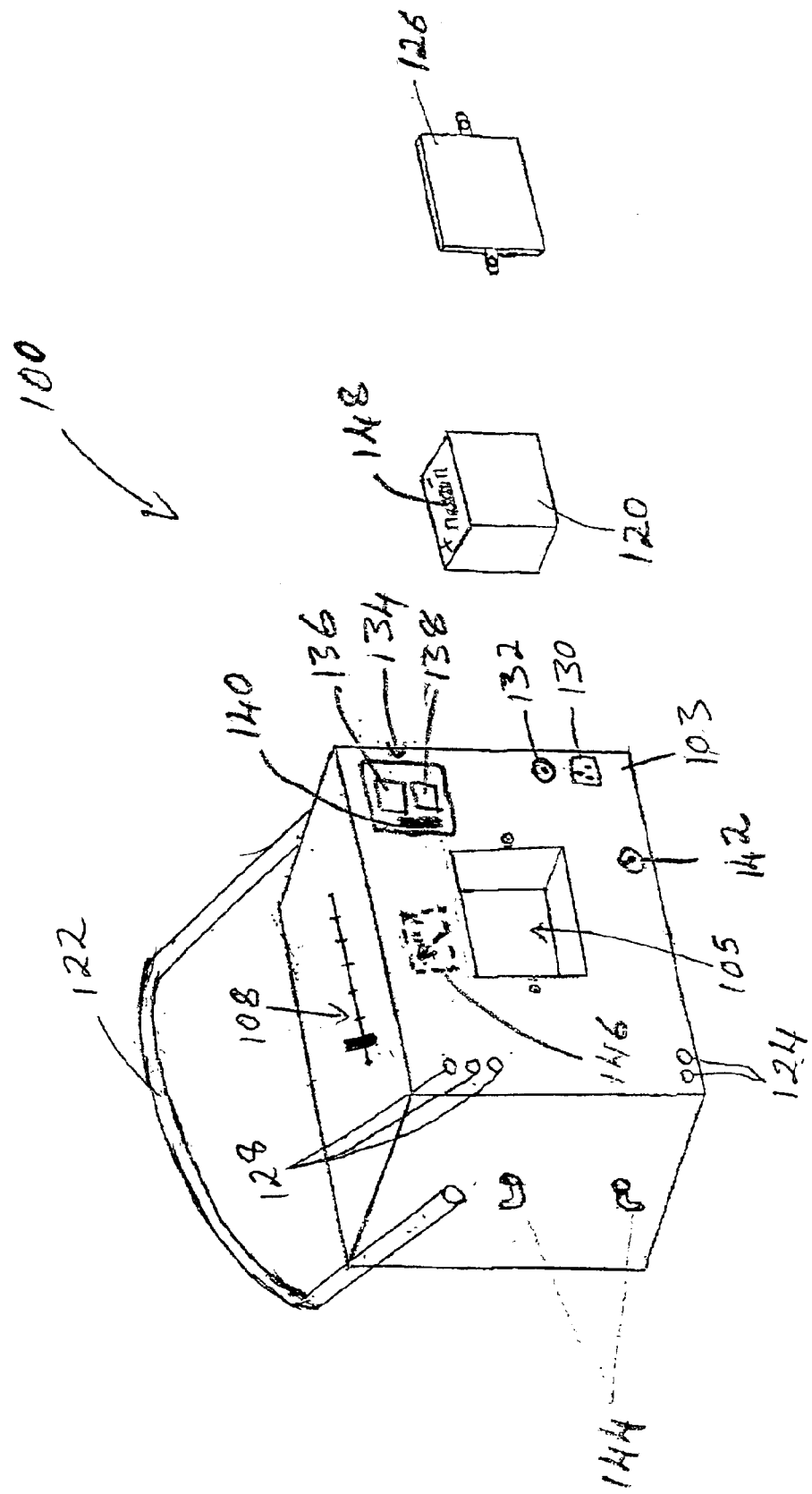
Figures 1, 2:
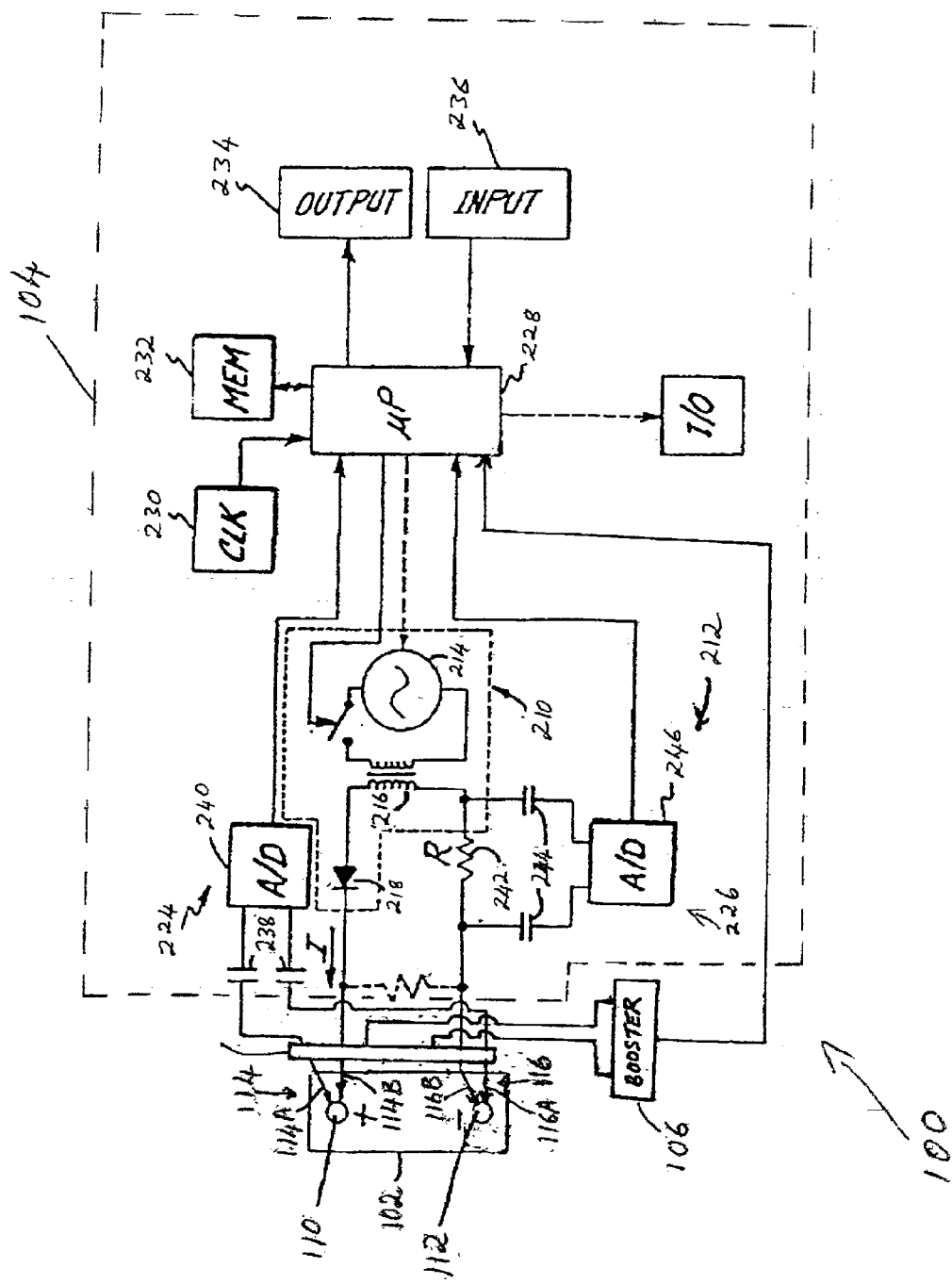
Figure 2:
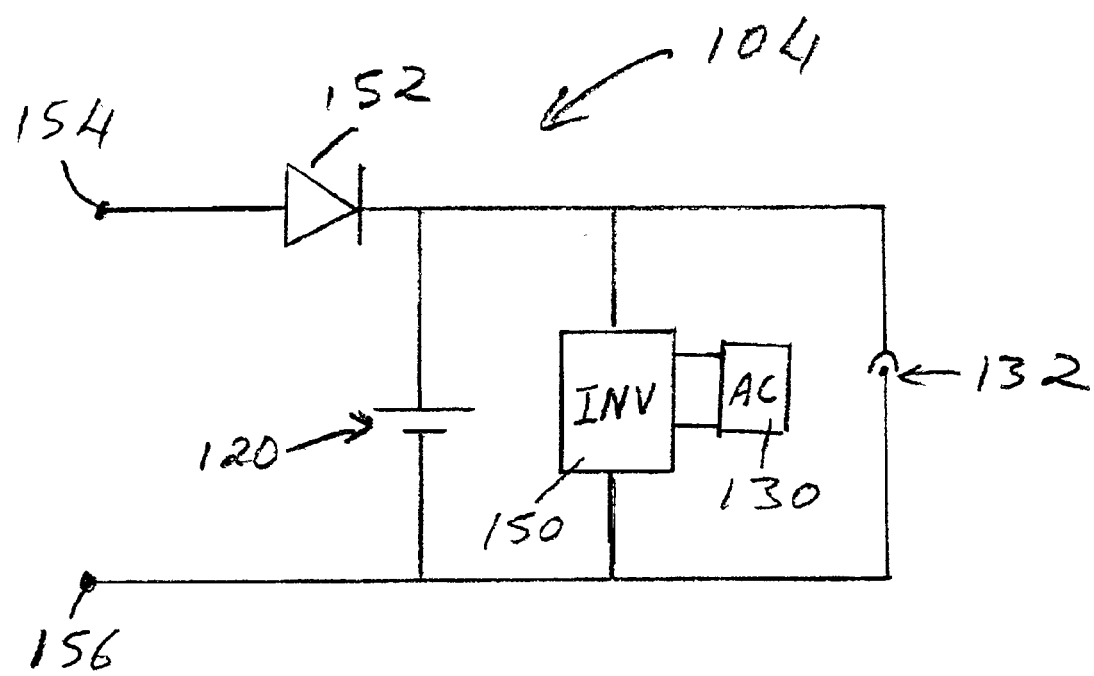

FIG. 1-2 is an exploded view of a battery charger with an integrated jump-start booster pack in accordance with an embodiment of the present invention. Portable system 100 includes a housing 103 with a battery cavity 105 that can receive a booster battery 120. Internal to housing 103, is circuitry of booster 106 and battery charger 104. A handle 122 is included for conveniently carrying portable system 100. Polarized plugs 124 are included for easy connection of cables, which are employed to electrically couple system 100 to a vehicle battery (not shown in FIG. 1-2). Lid 126, which may be any type of easily removable lid, is provided to hold booster battery 120 in place within battery cavity 105. Also included is mode selection switch 108, which is typically slidably coupled to housing 103, and LED(s) 128 that indicate different statuses such as charge level of the vehicle battery (not shown in FIG. 1-2), etc. System 100 is also capable of providing portable power. An auxiliary alternating current (AC) outlet 130 that provides power from internal booster battery 120 through an inverter (not shown in FIG. 1-2) is included in system 100. Further, an auxiliary direct current (DC) outlet 132 to supply portable power from internal booster battery 120 is also included in system 100. Output 132 may be identical to a cigarette lighter socket. Battery or low voltage operated devices such as emergency lamps, search lamps, a vacuum cleaner, etc., may be powered from booster battery 120 of system 100 by being connected from their own plug to an outlet (such as 130, 132) of system 100, when system 100 itself is not receiving power from an external source. System 100, which is also suitable for rental applications, includes a rental meter 134 that includes components such as an hour meter 136, a cycle counter 138, which tracks charge/discharge cycles of internal booster battery 120, and any type of code-protected resetting mechanism 140 to reset hour meter 136. Mechanism 140 can perform the resetting function when an owner of system 100 swipes a card through a reader (not shown) included in mechanism 140 and enters a code, for example. In some embodiments of the present invention, internal booster battery 120 may be charged by vehicle battery 102 (FIG. 1-1) or a vehicle alternator system (not shown) by electrically coupling to input 142, which couples to nodes 154 and 156 (see FIG. 2-2) of booster pack circuitry 106 of system 100. System 100 also includes support posts 144 that can be utilized for wrapping cables, and/or a recess (not shown) for stashing cables. A current and/or voltage gauge or meter 146 can optionally be included to provide current and/or voltage readings during operation of system 100.

Different types of batteries may be used as an internal battery for booster pack 120. A preferred internal booster battery 120 for a portable embodiment of system 100 is a Thin Metal Film lead acid battery. These batteries have very high cranking current, almost no reserve capacity, and very small size and weight. In some embodiments, internal booster battery 120 is a Valve Regulated Lead Acid (VRLA) battery. VRLA batteries are usually low cost and leak proof. Spirally wound VRLA batteries usually do no leak when held in different positions, no gassing occurs in such batteries and they have a high cranking current. Internal booster battery can be replaced relatively easily. In some embodiments of the present invention, internal booster battery 120 may include a maintenance due indicator 148, which provides an output indicating that maintenance is required as a function of battery conditions such as battery sulfation levels, etc. In embodiments of the present invention system 100 can provide a boost charge signal to the vehicle battery. The boost charge signal is a combination of the charge signal from the battery charger and the starting energy from the jump-start booster pack. Also, only the charge signal, or only the starting energy can be provided to vehicle battery 102, by selectively electrically coupling either battery charger 104 or booster 106 to vehicle battery 102 by making an appropriate selection on mode selection switch 108.

FIG. 2-1 is a simplified block diagram showing circuitry of combined battery charger and jump-start booster pack in accordance with an embodiment of the present invention. Battery charger 104, of system 100, includes battery charging circuitry 210 and battery testing circuitry 212. Battery charge circuitry 210 generally includes AC source 214 transformer 216 and rectifier 218. In one preferred embodiment, a four point (or Kelvin) connection technique is used in which battery charge circuitry 210 couples to vehicle battery 102 through electrical connections 114A and 116A while battery testing circuitry 212 couples to vehicle battery 102 through electrical connections 114B and 116B.

Battery testing circuitry 212 includes voltage measurement circuitry 224 and current measurement circuitry 226 which provide outputs to microprocessor 228. Microprocessor 228 also couples to a system clock 230 and memory 232 which is used to store information and programming instructions. In the embodiment of the invention shown in FIG. 2-2, microprocessor 228 also couples to booster pack 106, user output circuitry 234 and user input circuitry 236.

Voltage measurement circuitry 224 includes capacitors 238 which couple analog to digital converter 240 to vehicle battery 102 thorough electrical connections 114B and 116B. Any type of coupling mechanism may be used for element 238 and capacitors are merely shown as one preferred embodiment. Further, the device may also couple to DC signals. Current measurement circuitry 226 includes a shunt resistor (R) 242 and coupling capacitors 244. Shunt resistor 242 is coupled in series with battery charging circuitry 210. Other current measurement techniques are within the scope of the invention including Hall-Effect sensors, magnetic or inductive coupling, etc. An analog to digital converter 246 is connected across shunt resistor 242 by capacitors 244 such that the voltage provided to analog to digital converter 246 is proportional to a current I flowing through vehicle battery 102 due to charging circuitry 210. Analog to digital converter 246 provides a digitized output representative of this current to microprocessor 228.

During operation in vehicle battery charging mode, AC source 214 is coupled to vehicle battery 102 through transformer 216 and rectifier 218. Rectifier 218 provides half wave rectification such that current I has a non-zero DC value. Of course, full wave rectification or other AC sources may also be used. Analog to digital converter 246 provides a digitized output to microprocessor 228 which is representative of current I flowing through vehicle battery 102. Similarly, analog to digital converter 224 provides a digitized output representative of the voltage across the positive and negative terminals of vehicle battery 102. Analog to digital converters 224 and 246 are capacitively coupled to vehicle battery 102 such that they measure the AC components of the charging signal.

Microprocessor 228 determines the conductance of vehicle battery 102 based upon the digitized current and voltage information provided by analog to digital converters 246 and 224, respectively. Microprocessor 228 calculates the conductance of vehicle battery 102 as follows:

$$\text{Conductance} = G = \frac{I}{V} \qquad \text{Eq. 1}$$

where I is the AC charging current and V is the AC charging voltage across vehicle battery 102. Note that in one preferred embodiment the Kelvin connections allow more accurate voltage determination because these connections do not carry substantial current to cause a resultant drop in the voltage measured.

The battery conductance is used to monitor charging of vehicle battery 102. It has been discovered that as a battery is charged the conductance of the battery rises which can be used as feedback to the charger. This rise in conductance can be monitored in microprocessor 228 to determine when the battery has been fully charged.

In accordance with the present invention, the internal battery 120 of booster pack 106 is also charged and tested by circuitry 210 and 212 in a manner similar to that described for charging vehicle battery 102. In addition, system 100 can be used to jump-start a vehicle and perform operations as described in connection with FIG. 1.

FIG. 2-2 is a simplified block diagram showing circuitry included in jump-start booster pack 104. For simplification, mode selection switch 108 is not shown. However, the components shown in FIG. 2-2 are electrically coupled to booster battery 120 only when an appropriate selection is made on mode selection switch 108. As can be seen in FIG. 2-2, auxiliary AC outlet 130 provides power from internal booster battery 120 through inverter 150, which operates in a known manner to convert DC output from booster battery 120 to AC. Also shown in FIG. 2-2, is auxiliary DC output 132 which is directly coupled to booster battery 120. A diode 152 may be included to prevent backflow of energy from booster battery 102 when it is being charged by battery charger 104, vehicle battery 102 or vehicle alternator system (not shown) by electrically coupling to nodes 154 and 156.

Thus, the present invention relates to a battery charger/tester with an integrated jump-start booster pack to provide additional energy to a vehicle battery. It should be understood that the term "vehicle" not only includes cars and trucks, but can be equally applied to such installations as motors for boats, motorcycles, snowmobiles, farm tractors, etc.

Although the present invention has been described with reference to preferred embodiments, workers skilled in the art will recognize that changes may be made in form and detail without departing from the spirit and scope of the invention.

Patents related to batteries and electrical system testing are shown and described in U.S. Pat. No. 3,873,911, issued Mar. 25, 1975, to Champlin, entitled ELECTRONIC BATTERY TESTING DEVICE; U.S. Pat. No. 3,909,708, issued Sep. 30, 1975, to Champlin, entitled ELECTRONIC BATTERY TESTING DEVICE; U.S. Pat. No. 4,816,768, issued Mar. 28, 1989, to Champlin, entitled ELECTRONIC BATTERY TESTING DEVICE; U.S. Pat. No. 4,825,170, issued Apr. 25, 1989, to Champlin, entitled ELECTRONIC BATTERY TESTING DEVICE WITH AUTOMATIC VOLTAGE SCALING; U.S. Pat. No. 4,881,038, issued Nov. 14, 1989, to Champlin, entitled ELECTRONIC BATTERY TESTING DEVICE WITH AUTOMATIC VOLTAGE SCALING TO DETERMINE DYNAMIC CONDUCTANCE; U.S. Pat. No. 4,912,416, issued Mar. 27, 1990, to Champlin, entitled ELECTRONIC BATTERY TESTING DEVICE WITH STATE-OF-CHARGE COMPENSATION; U.S. Pat. No. 5,140,269, issued Aug. 18, 1992, to Champlin, entitled ELECTRONIC TESTER FOR ASSESSING BATTERY/CELL CAPACITY; U.S. Pat. No. 5,343,380, issued Aug. 30, 1994, entitled METHOD AND APPARATUS FOR SUPPRESSING TIME VARYING SIGNALS IN BATTERIES UNDERGOING CHARGING OR DISCHARGING; U.S. Pat. No. 5,572,136, issued Nov. 5, 1996, entitled ELECTRONIC BATTERY TESTER WITH AUTOMATIC COMPENSATION FOR LOW STATE-OF-CHARGE; U.S. Pat. No. 5,574,355, issued Nov. 12, 1996, entitled METHOD AND APPARATUS FOR DETECTION AND CONTROL OF THERMAL RUNAWAY IN A BATTERY UNDER CHARGE; U.S. Pat. No. 5,585,416, issued Dec. 10, 1996, entitled APPARATUS AND METHOD FOR STEP-CHARGING BATTERIES TO OPTIMIZE CHARGE ACCEPTANCE; U.S. Pat. No. 5,585,728, issued Dec. 17, 1996, entitled ELECTRONIC BATTERY TESTER WITH AUTOMATIC COMPENSATION FOR LOW STATE-OF-CHARGE; U.S. Pat. No. 5,589,757, issued Dec. 31, 1996, entitled APPARATUS AND METHOD FOR STEP-CHARGING BATTERIES TO OPTIMIZE CHARGE ACCEPTANCE; U.S. Pat. No. 5,592,093, issued Jan. 7, 1997, entitled ELECTRONIC BATTERY TESTING DEVICE LOOSE TERMINAL CONNECTION DETECTION VIA A COMPARISON CIRCUIT; U.S. Pat. No. 5,598,098, issued Jan. 28, 1997, entitled ELECTRONIC BATTERY TESTER WITH VERY HIGH NOISE IMMUNITY; U.S. Pat. No. 5,656,920, issued Aug. 12, 1997, entitled METHOD FOR OPTIMIZING THE CHARGING LEAD-ACID BATTERIES AND AN INTERACTIVE CHARGER; U.S. Pat. No. 5,757,192, issued May 26, 1998, entitled METHOD AND APPARATUS FOR DETECTING A BAD CELL IN A STORAGE BATTERY; U.S. Pat. No. 5,821,756, issued Oct. 13, 1998, entitled ELECTRONIC BATTERY TESTER WITH TAILORED COMPENSATION FOR LOW STATE-OF-CHARGE; U.S. Pat. No. 5,831,435, issued Nov. 3, 1998, entitled BATTERY TESTER FOR JIS STANDARD; U.S. Pat. No. 5,914,605, issued Jun. 22, 1999, entitled ELECTRONIC BATTERY TESTER; U.S. Pat. No. 5,945,829, issued Aug. 31, 1999, entitled MIDPOINT BATTERY MONITORING; U.S. Pat. No. 6,002,238, issued Dec. 14, 1999, entitled METHOD AND APPARATUS FOR MEASURING COMPLEX IMPEDANCE OF CELLS AND BATTERIES; U.S. Pat. No. 6,037,751, issued Mar. 14, 2000, entitled APPARATUS FOR CHARGING BATTERIES; U.S. Pat. No. 6,037,777, issued Mar. 14, 2000, entitled METHOD AND APPARATUS FOR DETERMINING BATTERY PROPERTIES FROM COMPLEX IMPEDANCE/ADMITTANCE; U.S. Pat. No. 6,051,976, issued Apr. 18, 2000, entitled METHOD AND APPARATUS FOR AUDITING A BATTERY TEST; U.S. Pat. No. 6,081,098, issued Jun. 27, 2000, entitled METHOD AND APPARATUS FOR CHARGING A BATTERY; U.S. Pat. No. 6,091,245, issued Jul. 18, 2000, entitled METHOD AND APPARATUS FOR AUDITING A BATTERY TEST; U.S. Pat. No. 6,104,167, issued Aug. 15, 2000, entitled METHOD AND APPARATUS FOR CHARGING A BATTERY; U.S. Pat. No. 6,137,269, issued Oct. 24, 2000, entitled METHOD AND APPARATUS FOR ELECTRONICALLY EVALUATING THE INTERNAL TEMPERATURE OF AN ELECTROCHEMICAL CELL OR BATTERY; U.S. Pat. No. 6,163,156, issued Dec. 19, 2000, entitled ELECTRICAL CONNECTION FOR ELECTRONIC BATTERY TESTER; U.S. Pat. No. 6,172,483, issued Jan. 9, 2001, entitled METHOD AND APPARATUS FOR MEASURING COMPLEX IMPEDANCE OF CELL AND BATTERIES; U.S. Pat. No. 6,172,505, issued Jan. 9, 2001, entitled ELECTRONIC BATTERY TESTER; U.S.

Pat. No. 6,222,369, issued Apr. 24, 2001, entitled METHOD AND APPARATUS FOR DETERMINING BATTERY PROPERTIES FROM COMPLEX IMPEDANCE/ADMITTANCE; U.S. Pat. No. 6,225,808, issued May 1, 2001, entitled TEST COUNTER FOR ELECTRONIC BATTERY TESTER; U.S. Pat. No. 6,249,124, issued Jun. 19, 2001, entitled ELECTRONIC BATTERY TESTER WITH INTERNAL BATTERY; U.S. Pat. No. 6,259,254, issued Jul. 10, 2001, entitled APPARATUS AND METHOD FOR CARRYING OUT DIAGNOSTIC TESTS ON BATTERIES AND FOR RAPIDLY CHARGING BATTERIES; U.S. Pat. No. 6,262,563, issued Jul. 17, 2001, entitled METHOD AND APPARATUS FOR MEASURING COMPLEX ADMITTANCE OF CELLS AND BATTERIES; U.S. Pat. No. 6,294,896, issued Sep. 25, 2001; entitled METHOD AND APPARATUS FOR MEASURING COMPLEX SELF-IMMITANCE OF A GENERAL ELECTRICAL ELEMENT; U.S. Pat. No. 6,294,897, issued Sep. 25, 2001, entitled METHOD AND APPARATUS FOR ELECTRONICALLY EVALUATING THE INTERNAL TEMPERATURE OF AN ELECTROCHEMICAL CELL OR BATTERY; U.S. Pat. No. 6,304,087, issued Oct. 16, 2001, entitled APPARATUS FOR CALIBRATING ELECTRONIC BATTERY TESTER; U.S. Pat. No. 6,310,481, issued Oct. 30, 2001, entitled ELECTRONIC BATTERY TESTER; U.S. Pat. No. 6,313,607, issued Nov. 6, 2001, entitled METHOD AND APPARATUS FOR EVALUATING STORED CHARGE IN AN ELECTROCHEMICAL CELL OR BATTERY; U.S. Pat. No. 6,313,608, issued Nov. 6, 2001, entitled METHOD AND APPARATUS FOR CHARGING A BATTERY; U.S. Pat. No. 6,316,914, issued Nov. 13, 2001, entitled TESTING PARALLEL STRINGS OF STORAGE BATTERIES; U.S. Pat. No. 6,323,650, issued Nov. 27, 2001, entitled ELECTRONIC BATTERY TESTER; U.S. Pat. No. 6,329,793, issued Dec. 11, 2001, entitled METHOD AND APPARATUS FOR CHARGING A BATTERY; U.S. Pat. No. 6,331,762, issued Dec. 18, 2001, entitled ENERGY MANAGEMENT SYSTEM FOR AUTOMOTIVE VEHICLE; U.S. Pat. No. 6,332,113, issued Dec. 18, 2001, entitled ELECTRONIC BATTERY TESTER; U.S. Pat. No. 6,351,102, issued Feb. 26, 2002, entitled AUTOMOTIVE BATTERY CHARGING SYSTEM TESTER; U.S. Pat. No. 6,359,441, issued Mar. 19, 2002, entitled ELECTRONIC BATTERY TESTER; U.S. Ser. No. 09/431,446, filed Nov. 1, 1999, entitled ALTERNATOR DIAGNOSTIC SYSTEM; U.S. Ser. No. 09/595,102, filed Jun. 15, 2000, entitled APPARATUS AND METHOD FOR TESTING RECHARGEABLE ENERGY STORAGE BATTERIES; U.S. Ser. No. 09/703,270, filed Oct. 31, 2000, entitled ELECTRONIC BATTERY TESTER; U.S. Ser. No. 09/575,629, filed May 22, 2000, entitled VEHICLE ELECTRICAL SYSTEM TESTER WITH ENCODED OUTPUT; U.S. Ser. No. 09/780,146, filed Feb. 9, 2001, entitled STORAGE BATTERY WITH INTEGRAL BATTERY TESTER; U.S. Ser. No. 09/816,768, filed Mar. 23, 2001, entitled MODULAR BATTERY TESTER; U.S. Ser. No. 09/756,638, filed Jan. 8, 2001, entitled METHOD AND APPARATUS FOR DETERMINING BATTERY PROPERTIES FROM COMPLEX IMPEDANCE/ADMITTANCE; U.S. Ser. No. 09/862,783, filed May 21, 2001, entitled METHOD AND APPARATUS FOR TESTING CELLS AND BATTERIES EMBEDDED IN SERIES/PARALLEL SYSTEMS; U.S. Ser. No. 09/483,623, filed Jan. 13, 2000, entitled ALTERNATOR TESTER; U.S. Ser. No. 09/870,410, filed May 30, 2001, entitled INTEGRATED CONDUCTANCE AND LOAD TEST BASED ELECTRONIC BATTERY TESTER; U.S. Ser. No. 09/960,117, filed Sep. 20, 2001, entitled IN-VEHICLE BATTERY MONITOR; U.S. Ser. No. 09/908,389, filed Jul. 18, 2001, entitled BATTERY CLAMP WITH INTEGRATED CIRCUIT SENSOR; U.S. Ser. No. 09/908,278, filed Jul. 18, 2001, entitled BATTERY CLAMP WITH EMBEDDED ENVIRONMENT SENSOR; U.S. Ser. No. 09/880,473, filed Jun. 13, 2001; entitled BATTERY TEST MODULE; U.S. Ser. No. 09/876,564, filed Jun. 7, 2001, entitled ELECTRONIC BATTERY TESTER; U.S. Ser. No. 09/878,625, filed Jun. 11, 2001, entitled SUPPRESSING INTERFERENCE IN AC MEASUREMENTS OF CELLS, BATTERIES AND OTHER ELECTRICAL ELEMENTS; U.S. Ser. No. 09/902,492, filed Jul. 10, 2001, entitled APPARATUS AND METHOD FOR CARRYING OUT DIAGNOSTIC TESTS ON BATTERIES AND FOR RAPIDLY CHARGING BATTERIES; and U.S. Ser. No. 09/940,684, filed Aug. 27, 2001, entitled METHOD AND APPARATUS FOR EVALUATING STORED CHARGE IN AN ELECTROCHEMICAL CELL OR BATTERY; U.S. Ser. No. 09/977,049, filed Oct. 12, 2001, entitled PROGRAMMABLE CURRENT EXCITER FOR MEASURING AC IMMITTANCE OF CELLS AND BATTERIES; U.S. Ser. No. 10/047,923, filed Oct. 23, 2001, entitled AUTOMOTIVE BATTERY CHARGING SYSTEM TESTER, U.S. Ser. No. 10/046,659, filed Oct. 29, 2001, entitled ENERGY MANAGEMENT SYSTEM FOR AUTOMOTIVE VEHICLE; U.S. Ser. No. 09/993,468, filed Nov. 14, 2001, entitled KELVIN CONNECTOR FOR A BATTERY POST; U.S. Ser. No. 09/992,350, filed Nov. 26, 2001, entitled ELECTRONIC BATTERY TESTER, U.S. Ser. No. 10/042,451, filed Jan. 8, 2002, entitled BATTERY CHARGE CONTROL DEVICE; U.S. Ser. No. 10/042,451, filed Jan. 8, 2002, entitled BATTERY CHARGE CONTROL DEVICE, U.S. Ser. No. 10/073,378, filed Feb. 8, 2002, entitled METHOD AND APPARATUS USING A CIRCUIT MODEL TO EVALUATE CELL/BATTERY PARAMETERS; U.S. Ser. No. 10/093,853, filed Mar. 7, 2002, entitled ELECTRONIC BATTERY TESTER WITH NETWORK COMMUNICATION; U.S. Ser. No. 60/364,656, filed Mar. 14, 2002, entitled ELECTRONIC BATTERY TESTER WITH LOW TEMPERATURE RATING DETERMINATION; U.S. Ser. No. 10/101,543, filed Mar. 19, 2002, entitled ELECTRONIC BATTERY TESTER; U.S. Ser. No. 10/112,114, filed Mar. 28, 2002; U.S. Ser. No. 10/109,734, filed Mar. 28, 2002; U.S. Ser. No. 10/112,105, filed Mar. 28, 2002 and U.S. Ser. No. 10/112,998, filed Mar. 29, 2002, which are incorporated herein in their entirety.

What is claimed is:

1. An apparatus for providing energy to a vehicle battery:
    a positive connector configured to couple to a positive terminal of the vehicle battery;
    a negative connector configured to couple to a negative terminal of the vehicle battery;
    a battery charger configured to apply a charge signal to the vehicle battery through the positive and negative connectors to thereby charge the vehicle battery; and
    a jump-start booster pack, coupled to the battery charger, which is configured to provide starting energy to the vehicle battery through the positive and negative connectors, and to receive a charging signal from the battery charger,
    wherein the battery charger and the jump-start booster pack are integrated, and wherein the battery charger is configured to apply the charge signal to the vehicle battery, via a mode selection switch, when the jump-start booster pack is electrically isolated from the vehicle battery by the mode selection switch.

2. The apparatus of claim 1 wherein the starting energy form the jump-start booster pack is provided by an internal booster battery.

3. The apparatus of claim 2 further comprising battery testing circuitry configured to test the vehicle battery and the internal booster battery.

4. The apparatus of claim 2 wherein the internal booster battery is a Valve Regulated Lead Acid battery.

5. The apparatus of claim 2 wherein the internal booster battery is a Thin Metal Film Lead Acid battery.

6. The apparatus of claim 2 wherein an auxiliary alternating current output is provided from the internal booster battery.

7. The apparatus of claim 6 wherein the auxiliary alternating current output is provided from the internal booster battery via an inverter.

8. The apparatus of claim 2 wherein an auxiliary direct current output is provided from the internal booster battery.

9. The apparatus of claim 1 further comprising a rental meter.

10. The apparatus of claim 9 wherein the rental meter includes an hour meter.

11. The apparatus of claim 9 wherein the rental meter includes a cycle counter for an internal booster battery.

12. The apparatus of claim 9 wherein the rental meter includes a code-protected resetting mechanism.

13. The apparatus of claim 1 further comprising support posts, coupled to a housing, around which cables can be wrapped.

14. The apparatus of claim 1 configured to provide a boost charge signal to the vehicle battery, the boost charge signal is a combination of the charge signal from the battery charger and the starting energy from the jump-start booster pack.

15. The apparatus of claim 2 configured to receive an external charging signal from the vehicle battery and to provide the external charging signal to the internal booster battery.

16. The apparatus of claim 2 configured to receive an external charging signal from a vehicle alternator and to provide the external charging signal to the internal booster battery.

17. The apparatus of claim 2 wherein the internal booster battery comprises a maintenance indicator.

18. The apparatus of claim 1 wherein the positive connector is a first Kelvin connector and the negative connector is a second Kelvin connector.

19. Aft method of providing energy to a vehicle battery:
 (a) coupling a positive connector to a positive terminal of the vehicle battery;
 (b) coupling a negative connector to a negative terminal of the vehicle battery;
 (c) providing a battery charger configured to apply a charge signal to the vehicle battery through the positive and negative connectors to thereby charge the vehicle battery; and
 (d) providing a jump-start booster pack, coupled to the battery charger, which is configured to provide starting energy to the vehicle battery through the positive and negative connectors, and to receive a charging signal from the battery charger,
 wherein the battery charger and the jump-start booster pack are integrated, and wherein the battery charger is configured to apply the charge signal to the vehicle battery when the jump-start booster pack is electrically isolated from the vehicle battery.

20. The method of claim 19 further comprising providing a boost charge signal to the vehicle battery, wherein the boost charge signal is a combination of the charge signal from the battery charger and the starting energy from the jump-start booster pack.

21. The method of claim 19 wherein the coupling steps (a) and (b) are carried out using a first Kelvin connector and a second Kelvin connector.

22. The method of claim 19 wherein the starting energy form the jump-start booster pack is provided by an internal booster battery.

* * * * *

UNITED STATES PATENT AND TRADEMARK OFFICE
CERTIFICATE OF CORRECTION

PATENT NO. : 6,788,025 B2
DATED : September 7, 2004
INVENTOR(S) : Bertness et al.

It is certified that error appears in the above-identified patent and that said Letters Patent is hereby corrected as shown below:

Column 10,
Line 6, change "Aft" to -- A --.

Signed and Sealed this

Sixth Day of September, 2005

JON W. DUDAS
*Director of the United States Patent and Trademark Office*